April 22, 1958     W. H. WILKINSON     2,831,727
LOW SLUNG REFUSE DUMP TRUCK

Filed Jan. 4, 1955     2 Sheets-Sheet 1

INVENTOR
WILLIAM H. WILKINSON
BY
Bacon & Thomas
ATTORNEYS

April 22, 1958 W. H. WILKINSON 2,831,727
LOW SLUNG REFUSE DUMP TRUCK
Filed Jan. 4, 1955 2 Sheets-Sheet 2
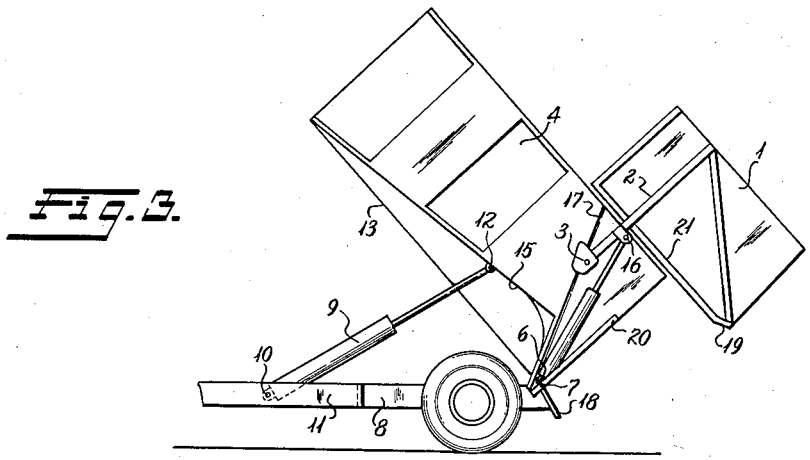
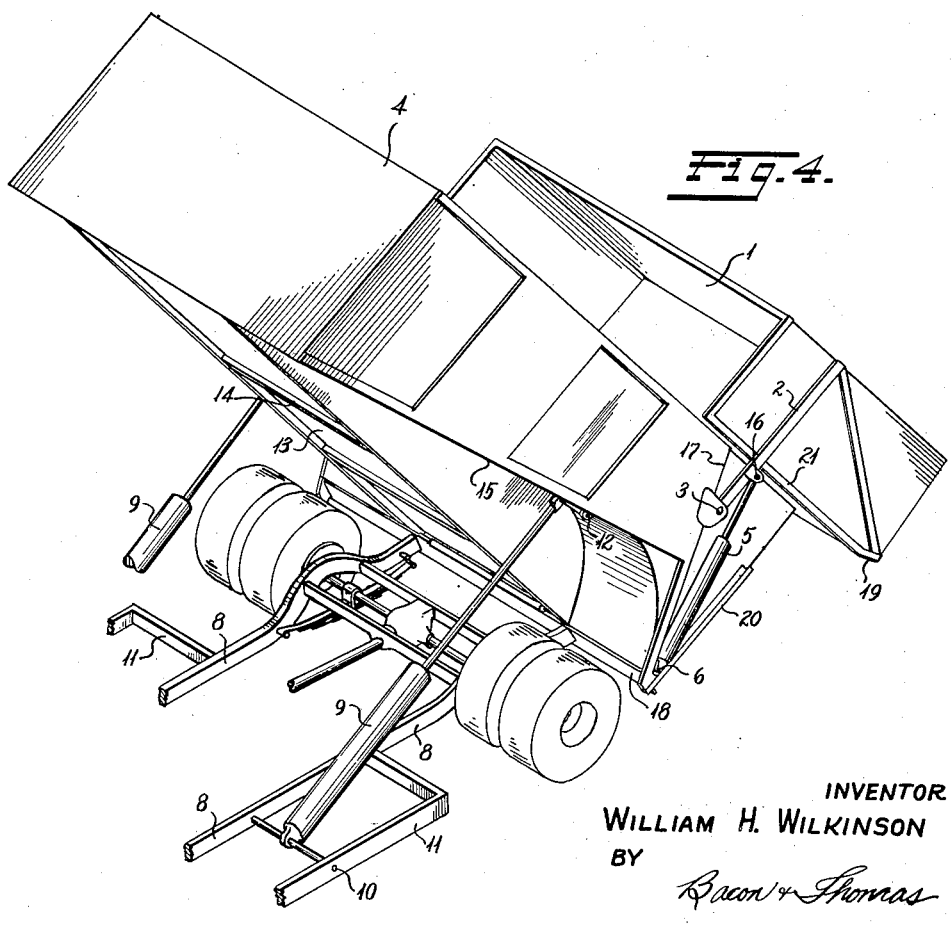
INVENTOR
WILLIAM H. WILKINSON
BY
Bacon & Thomas
ATTORNEYS

United States Patent Office 2,831,727
Patented Apr. 22, 1958

2,831,727

LOW SLUNG REFUSE DUMP TRUCK

William H. Wilkinson, Troy, N. Y., assignor to Fred M. Brodie, Jr., Amsterdam, N. Y.

Application January 4, 1955, Serial No. 479,789

7 Claims. (Cl. 298—22)

This invention relates to a dump truck construction adapted for the collection and dumping of refuse.

One object of the invention is to provide a truck in which the receptacle portion or box for containing the refuse is of large capacity while at the same time the sides of the receptacle portion are not too high for an attendant standing on the ground to deposit refuse in the receptacle.

Another object of the invention is to provide a truck in which the receptacle portion is supported in a relatively low position on the frame of a chassis of low-slung construction, generally employed for route trucks.

A further object of the invention is to increase the holding capacity for such a truck by providing an additional or auxiliary receptacle portion at the rear of the main receptacle body.

A still further object of the invention is to provide means for first hoisting and tilting the auxiliary receptacle portion to a dumping position and for then tilting the main box or receptacle portion to its dumping position.

A yet further object of the invention is to provide an arrangement of hydraulic means to carry out the dumping operation of the auxiliary and main receptacle portions.

Further and additional objects and advantages will become apparent to those skilled in the art as the description proceeds in connection with the accompanying drawings, wherein:

Fig. 3 is a view similar to Fig. 2, but showing both receptacle portions in dumping positions; and Fig. 4 is a perspective view of the rear portion of the truck with both receptacle portions in dumping position, and shows the truck chassis structure and the hydraulic operating means under the main receptacle portion.

Figure 1:
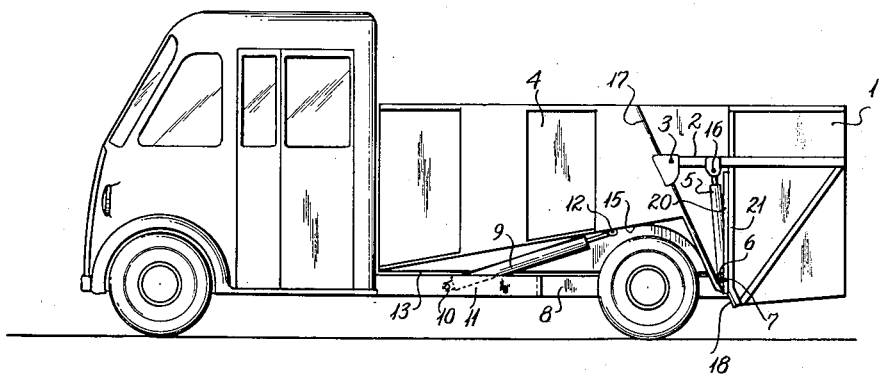
Fig. 1 is a view in side elevation of the truck construction, with both receptacle portions in position to receive refuse.

As shown in Figs. 1 and 4, the main receptacle portion 4 consists of a box of generally rectangular form. The bottom 13 of this receptacle, which may be reinforced as at 14, normally rests directly on the main frame 8 of the truck. At either side of the truck, the floor of the main receptacle portion is relieved or recessed to form nacelles to accommodate the rear wheels of the truck and the hydraulic operating means 9. The receptacle portion 4 has an open rear end to allow dumping of its contents when in tilted position. The main receptacle portion 4 is pivoted at its rear end to the rear of the frame 8, as shown at 7, so that this receptacle can be tilted from the horizontal or loading position, as shown in Fig. 1, to the inclined or dumping position shown in Figs. 3 and 4. The means for moving the receptacle 4 from one position to the other are hydraulic jacks 9, one at each side of the truck, located in the nacelles 15 and pivoted at one end 12 to the receptacle portion 4, and pivoted at the other end, as shown at 10, to a bar or the like supported at one end on the frame 8 and at its other end on frame extension member 11. The hydraulic jacks 9 are of the conventional double acting type which may be actuated to move the receptacle portion 4 from the horizontal position, as shown in Fig. 1, to the tilted position shown in Figs. 3 and 4, or vice versa.

An auxiliary receptacle portion 1 is mounted at the rear end of receptacle portion 4. Its front is open, and when in the loading position shown in Fig. 1, it forms a continuation of the receptacle portion 4. To increase its capacity, the receptacle portion 1 has its bottom wall somewhat below the bottom of portion 4, but still enough above the pavement level to clear the conventional curb.

Figure 2:
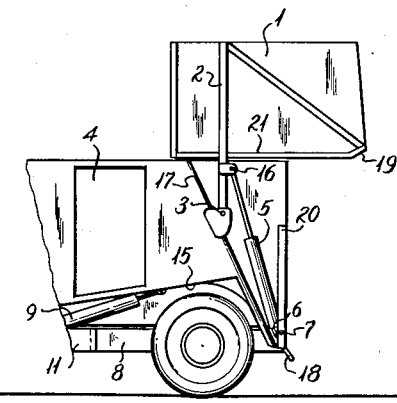
Fig. 2 is a similar but fragmentary view showing the rear portion of the truck with the auxiliary receptacle portion in dumping position.

As shown, the receptacle portion 1 is fixedly mounted on arms 2, there being one at either side thereof. These arms which may be of angle iron or other conventional shape extend forwardly beyond the sides of the receptacle portion 1 and are pivoted at their forward ends, as shown at 3, to brackets on the sides of the receptacle portion 4 so that the portion 1 may be moved from the loading position of Fig. 1 to the dumping position of Fig. 2.

Hydraulic jacks 5 are provided for moving the receptacle 1 to and from the positions shown. These jacks are connected at one end to the arms 2 by a pivot 16, and are connected at their other ends by means of a pivot 6 to the rear lower sides of the receptacle portion 4.

It will be obvious that in the tilting movement of the receptacle 1 relative to the receptacle 4, the sides of the former must move into a partially overlapping relation to the sides of the latter. If the sides of the receptacles were coplanar, there would be interference. To avoid this, the rearmost portions of the sides of the receptacle 4 are slightly offset inwardly to allow the sides of receptacle 1 to telescope over them during the relative movement of the receptacles. The line on which the sides of the receptacle 4 is offset is indicated at 17.

The rear edges of the sides of the receptacle 4 are provided with rigid reinforcing members 20 of channel form. These members serve as abutments for angle iron reinforcements 21 provided on the forward edges of the sides of the auxiliary receptacle 1, when the receptacles are in the loading position, as shown in Fig. 1. The channel-shaped members 20 also serve to partially house and thereby protect the hydraulic cylinders 5.

It will be observed that the members 20 terminate short of the top edge of the sides of the receptacle 4. This arrangement allows the tilting of the receptacle 1 without interference of the channel member 20 with the angle 21.

An additional feature which facilitates the discharge of the load by directing the flow thereof rearwardly of the truck is the apron 18 mounted on the rear end of the truck frame. This apron abuts slanted bottom edges 19 provided on angle iron 21 at the sides of the receptacle 1 when the latter is in the loading position, as shown in Fig. 1.

The apron 18 serves the additional purpose of forming a closure for the lower front portion of the auxiliary receptacle when the latter is in the loading position as shown in Fig. 1.

While the construction above described is primarily intended for the collection and disposal of refuse, it is obvious that it is also well adapted to handle any other dumpable materials.

The low swung mounting of the receptacles allows the side walls of the receptacles to be low enough to permit an attendant standing on the ground to deposit material in them, while at the same time the receptacles may be of large capacity.

If it is desired to provide for a separation of the materials deposited in the receptacles, this could obviously be accomplished by providing a removable closure for the rear end of receptacle 4. This closure could be released after the receptacle 1 has been emptied.

From the above description, the operation of the truck will obviously be as follows:

The receptacles 1 and 4 in the position shown in Fig. 1 may be filled by an attendant standing on the ground without having another attendant on the truck for assistance and he may readily climb into the truck to compact the load from time to time. When the receptacles are filled, and the truck has been taken to the place where the material is to be dumped, the hydraulic jacks 5 are first actuated to raise the receptacle 1 to the position shown in Fig. 2 and the material falls out of the open forward end of the receptacle. Next the hydraulic jacks 9 are actuated to tilt the main receptacle 4 to the position shown in Figs. 2, 3 and 4, and the material therein is then discharged.

It is to be noted that the nacelles over the rear wheels of the truck extend into the body of the receptacle portion 4 and are of substantial lateral width. The upper surfaces of those nacelles, which define part of the floor of the receptacle, slope gradually forward from their highest point to the front end of receptacle portion 4. Thus all material resting on those surfaces can readily slide thereover to be dumped when the body is tilted as shown in Figs. 3 and 4.

While only one specific embodiment of the invention has been illustrated and described herein, it is to be understood that modifications may be resorted to without departing from the invention as defined in the appended claims.

I claim:

1. A truck for use in the collection, transportation and dumping of material, said truck comprising wheels and a low-slung chassis frame below the tops of said wheels, a receptacle for the material having its bottom supported directly on the frame of the truck chassis below the tops of said wheels, said receptacle being pivotally mounted adjacent its rear end to said frame for tilting movement from a horizontal loading position to an inclined dumping position, hydraulic means pivotally connected to said receptacle and to said frame for tilting said receptacle, and spaced recessed nacelles on said bottom and extending upwardly therefrom to accommodate the rear wheels of the truck and said hydraulic means.

2. A truck as set forth in claim 1 in combination with an auxiliary receptacle portion pivotally mounted on the rear of the first-named receptacle, and further hydraulic means for tilting the auxiliary portion relative to the first-named receptacle.

3. A truck as set forth in claim 2 in which the rear end of the first-named receptacle and the forward end of the auxiliary receptacle portion are open, said receptacles being so arranged that the auxiliary receptacle portion forms a continuation of the first-named receptacle when the receptacles are in loading position.

4. In a truck for use in the collection, transportation and dumping of material, the combination of a main receptacle portion for the material, an auxiliary receptacle portion, the main receptacle portion being pivotally connected adjacent its rear end to the truck chassis for tilting movement to dump the material, and the auxiliary receptacle portion being pivotally connected adjacent its forward end to the sides of the main receptacle portion near the rear thereof for tilting movement relative thereto, said auxiliary receptacle extending entirely rearwardly of said pivotal connection between the main receptacle and chassis when said receptacles are in load-receiving position, both receptacle portions being substantially rectangular in cross-section and the rear side of the main receptacle portion and the forward side of the auxiliary receptacle portion being open and substantially in juxtaposition when the receptacle portions are in loading position, whereby the auxiliary receptacle portion forms a rearward continuation of the main receptacle portion to define a large-capacity receptacle, the rear portions of the lateral sides of the main receptacle portion being offset inwardly to allow them to telescope partially within the corresponding lateral sides of the auxiliary receptacle portion during tilting movement of the auxiliary receptacle relative to the main receptacle portion.

5. In a truck for use in the collection, transportation and dumping of material, the combination of a main receptacle portion and an auxiliary receptacle portion pivotally mounted thereon for tilting movement to dump the contents thereof, hydraulic means for causing the tilting movement, the main receptacle portion and the auxiliary receptacle portion having sides, the edges of which are substantially in juxtaposition when the auxiliary receptacle portion is in normal untilted position whereby the auxiliary receptacle portion forms a continuation of the main receptacle portion, said edges of the receptacle portions having reinforcing members rigidly affixed thereto and adapted to abut each other when the auxiliary receptacle portion is in untilted position, said reinforcing members affixed to the edges of the main receptacle portion being of channel form and partially housing said hydraulic means.

6. The combination as set forth in claim 5 in which the rear portion of the sides of the main receptacle portion are offset inwardly thereof sufficiently to allow them to telescope to some extent within the sides of the auxiliary receptacle portion during tilting movement of the auxiliary recepetacle relative to the main receptacle portion.

7. The combination as set forth in claim 6 in which the reinforcing members of channel form on the edges of the rear sides of the main receptacle portion terminate short of the top of said sides whereby they do not interfere with the reinforcing members on the front edges of the sides of the auxiliary receptacle portion during tilting movement of the latter.

References Cited in the file of this patent

UNITED STATES PATENTS

| 543,167 | Bate | July 23, 1895 |
| 1,566,540 | Ketcham | Dec. 22, 1925 |
| 2,226,193 | Barrett | Dec. 24, 1940 |
| 2,263,199 | Wachter et al. | Nov. 18, 1941 |
| 2,557,142 | Reitz | June 19, 1951 |

FOREIGN PATENTS

| 788,966 | France | Oct. 21, 1935 |
| 857,743 | France | Sept. 26, 1940 |